Oct. 21, 1969       A. PAREDES       3,473,411
HYDROKINETIC TORQUE CONVERTER TRANSMISSION WITH
                   MECHANICAL OVERDRIVE
Filed Feb. 20, 1968                    10 Sheets-Sheet 1
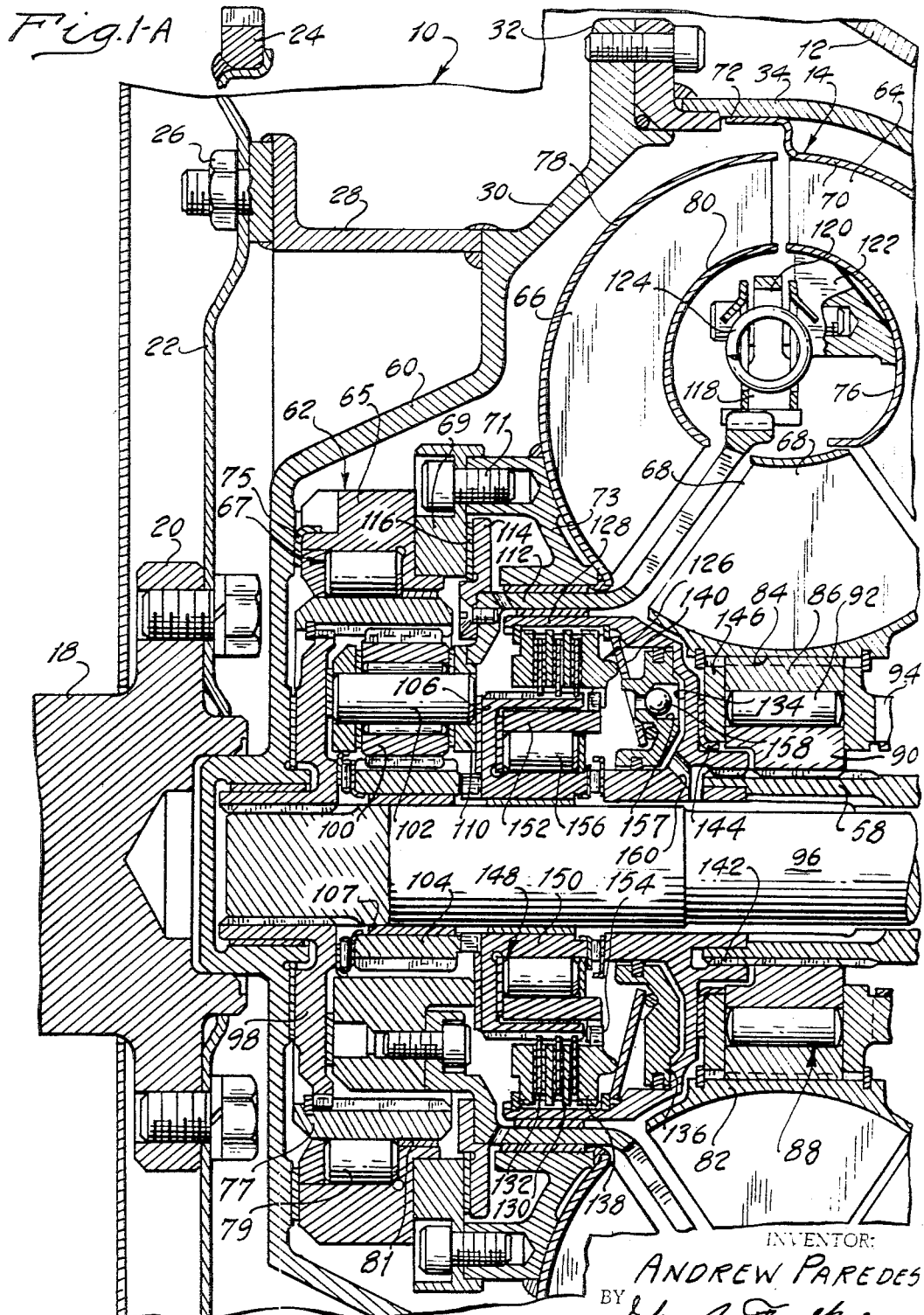
Fig.1-A
INVENTOR:
ANDREW PAREDES
BY
ATTORNEYS.

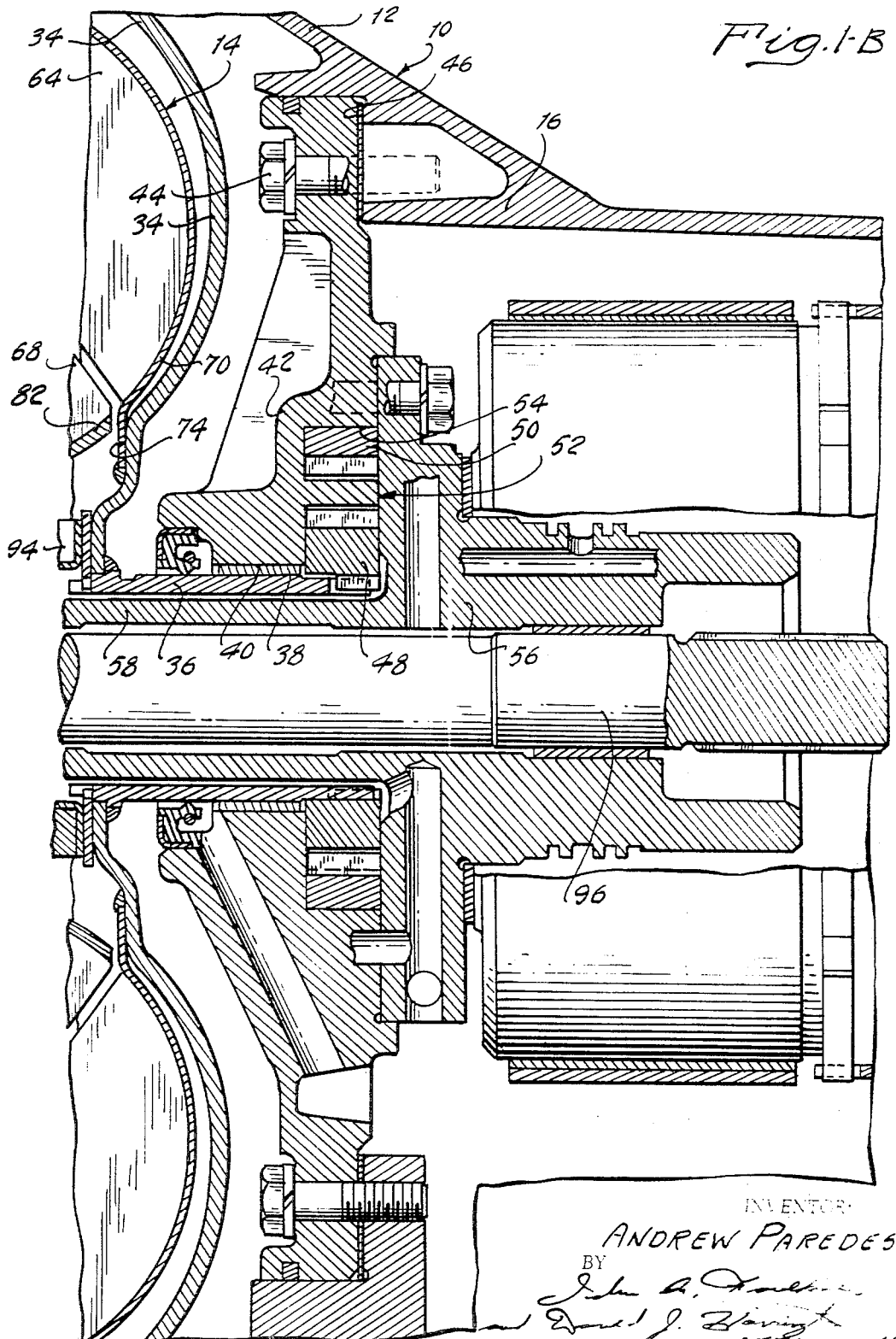

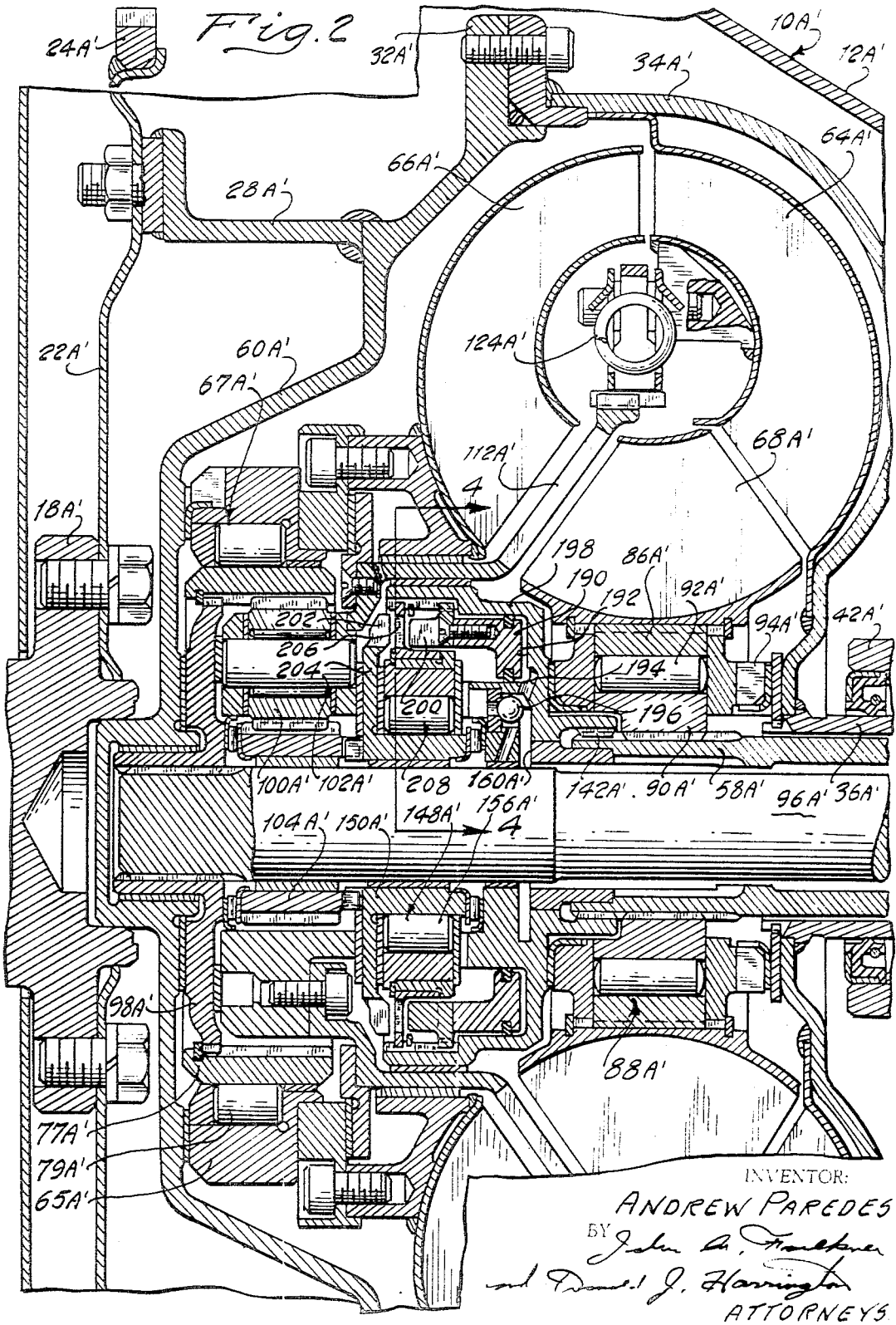

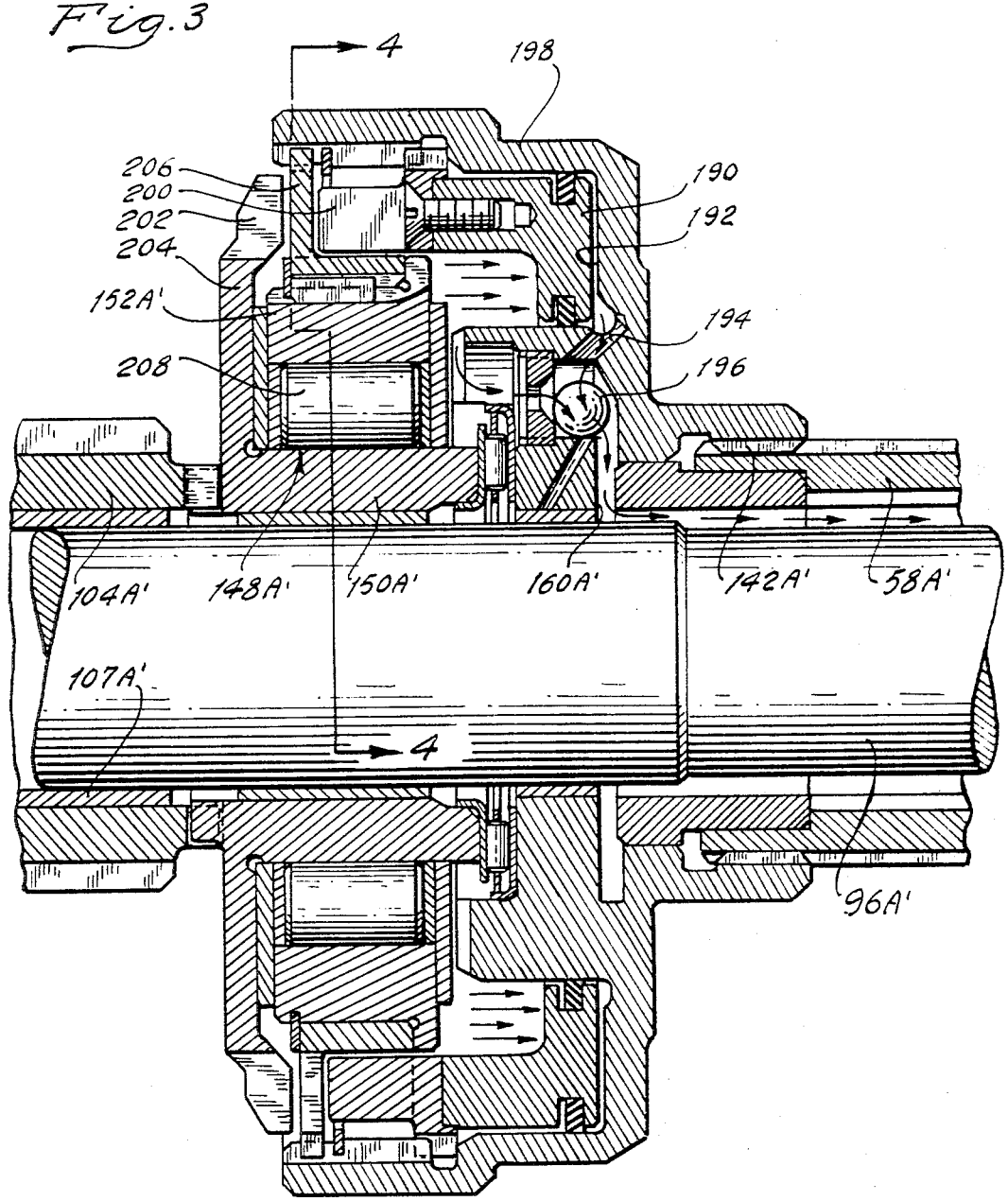

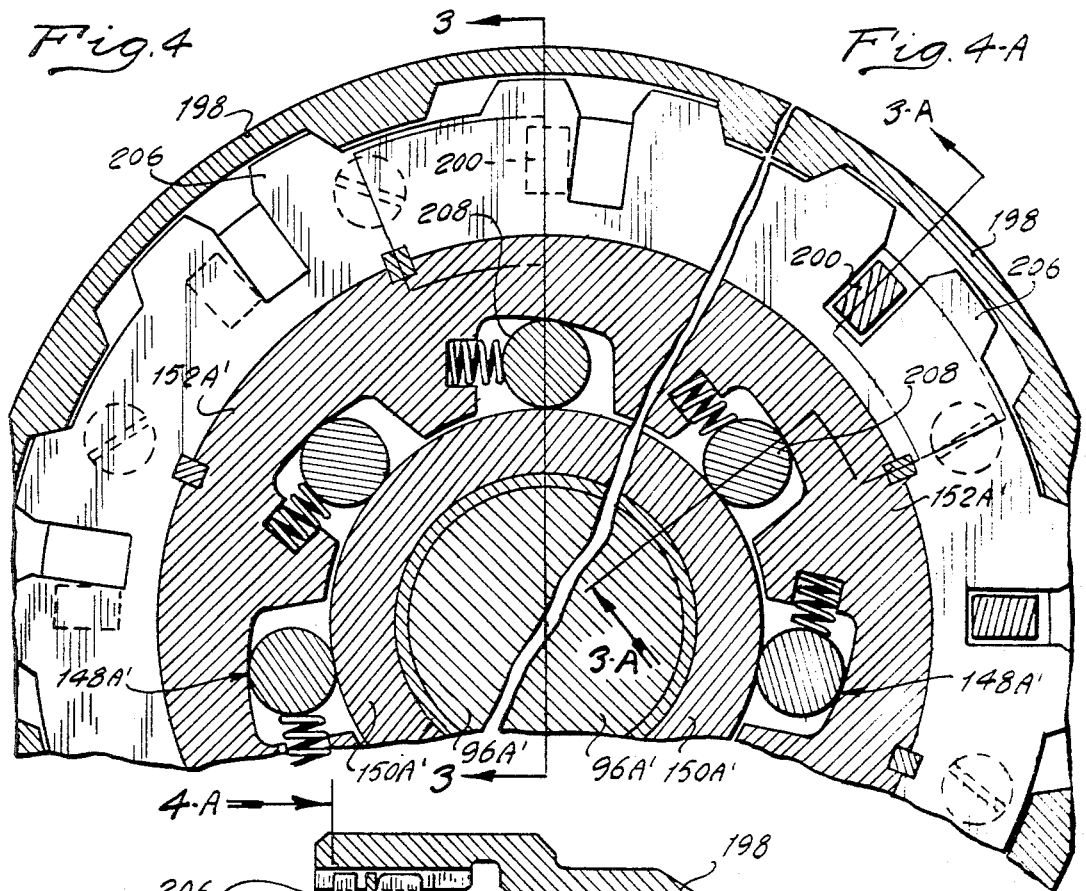
Fig.4  Fig.4-A
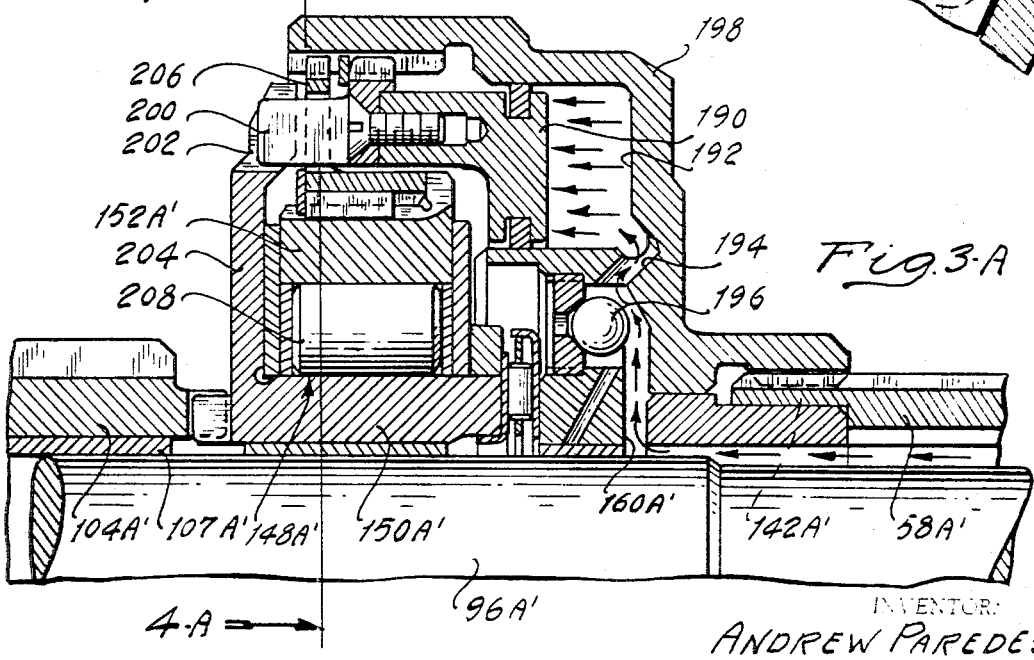
Fig.3-A
INVENTOR:
ANDREW PAREDES
BY
ATTORNEYS.

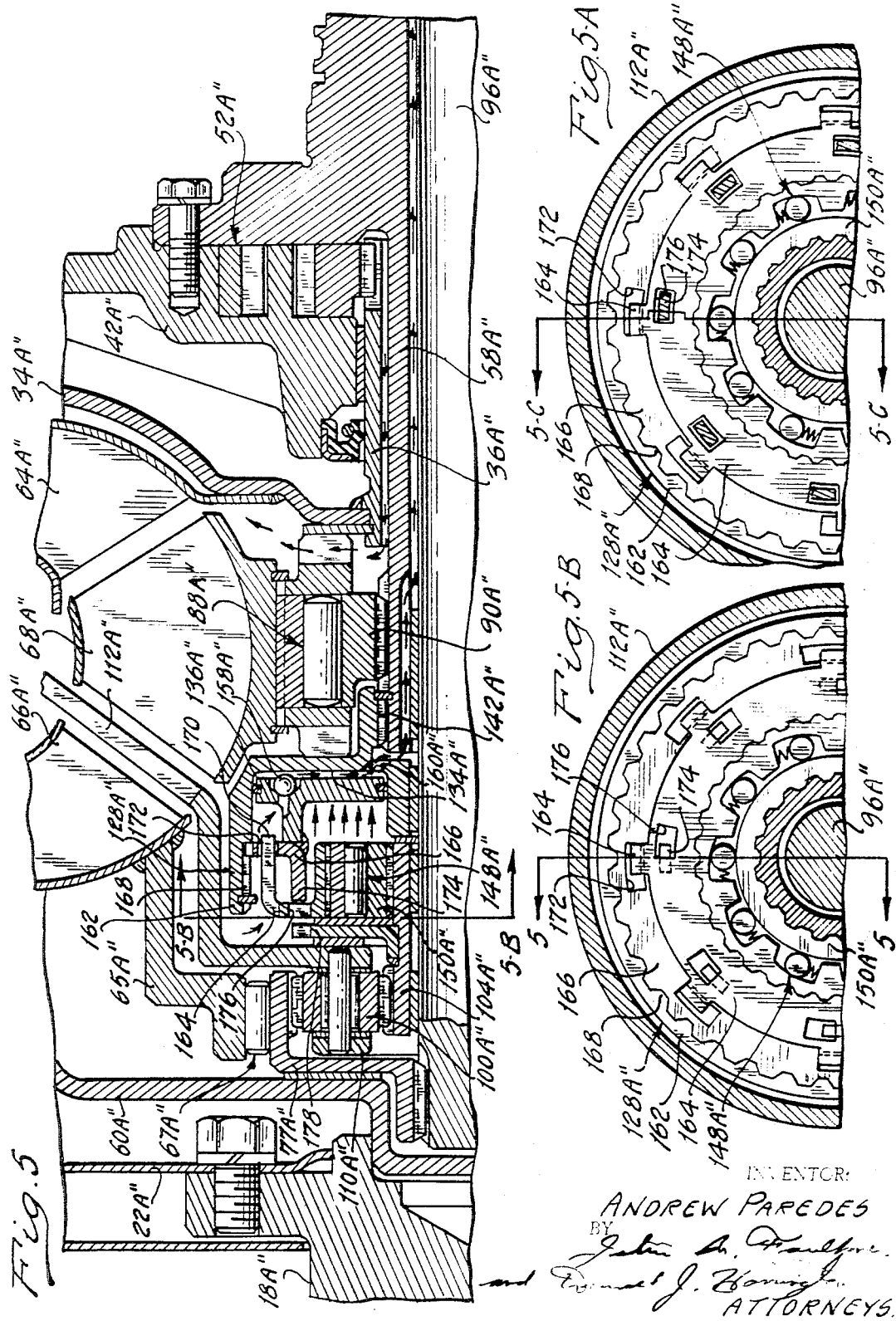

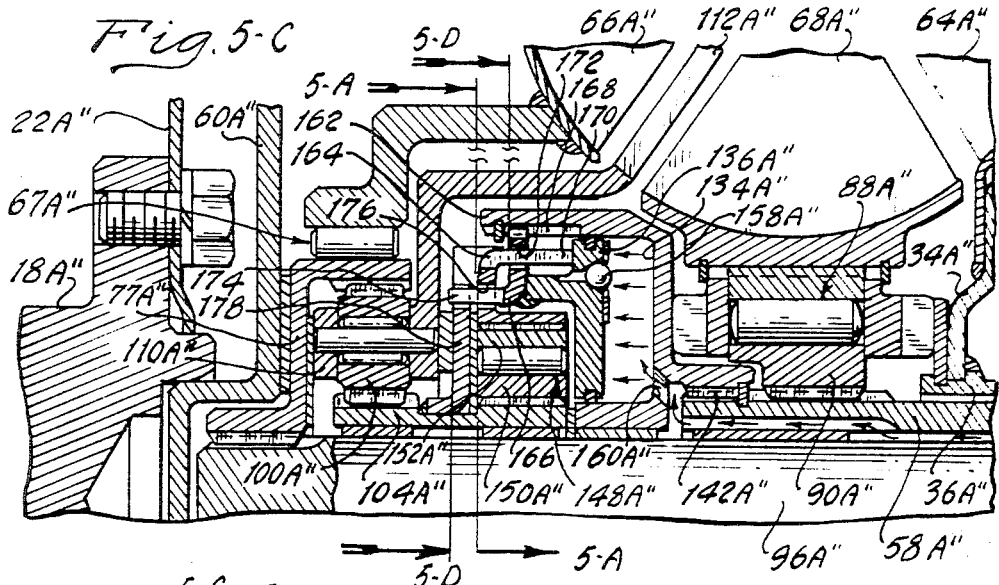
Fig. 5-C
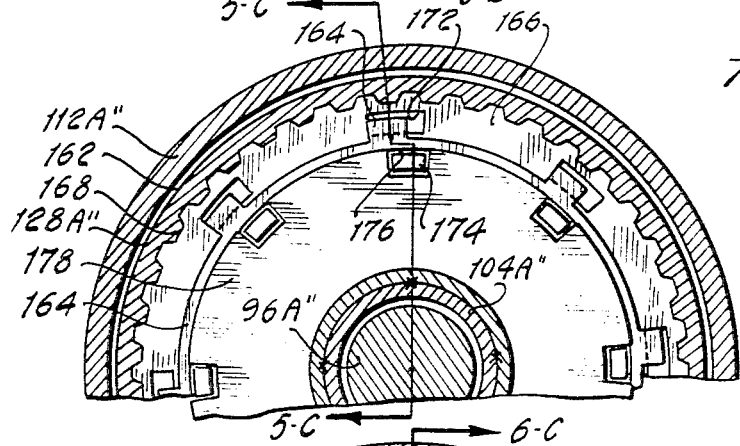
Fig. 5-D
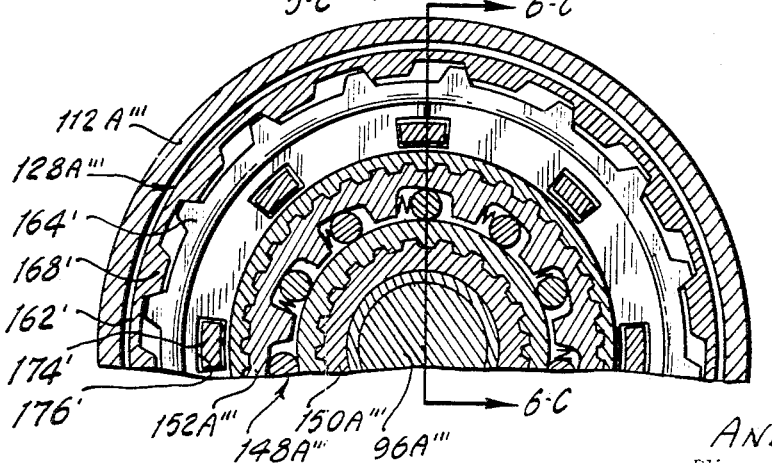
Fig. 6-B
INVENTOR:
ANDREW PAREDES
ATTORNEYS.

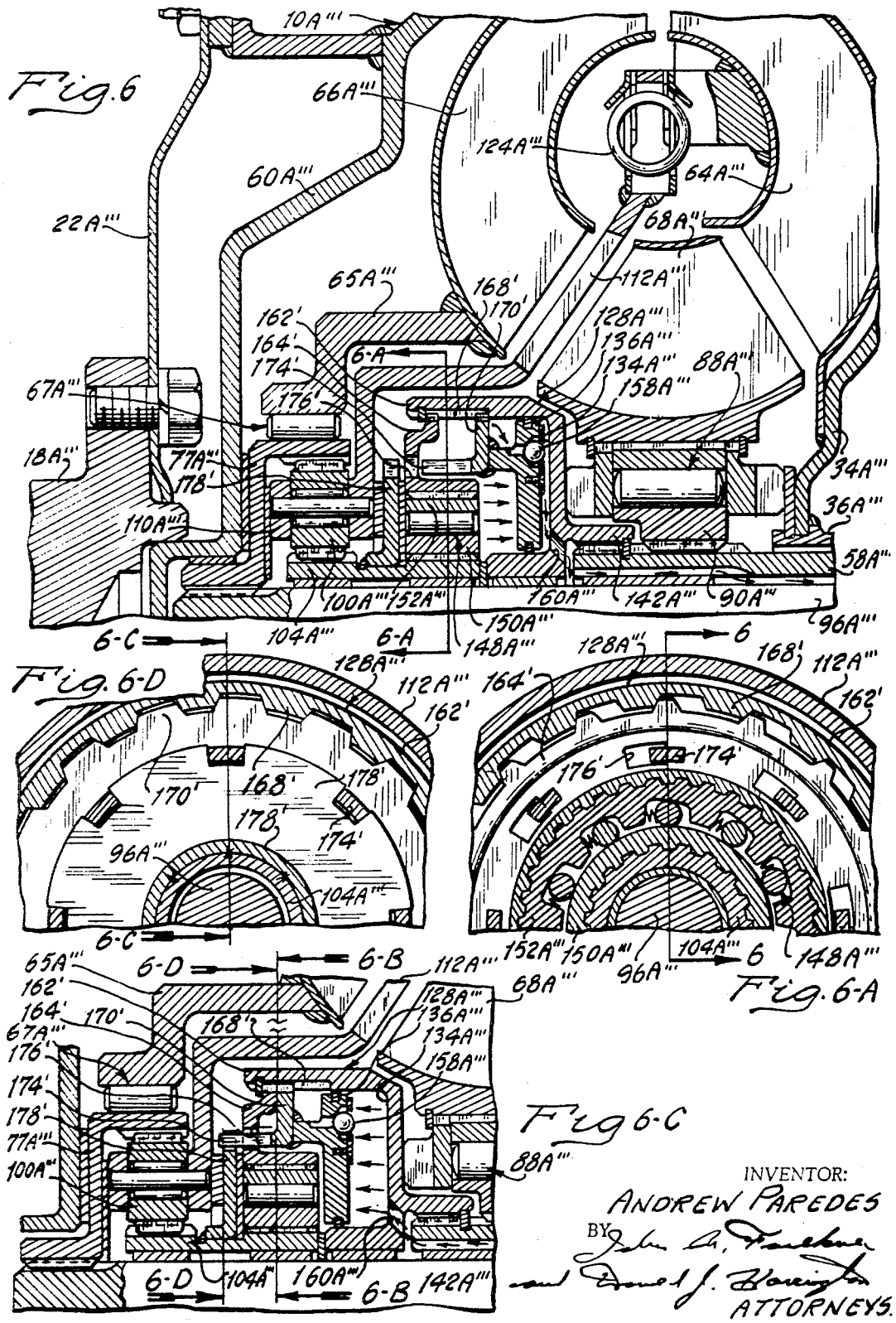

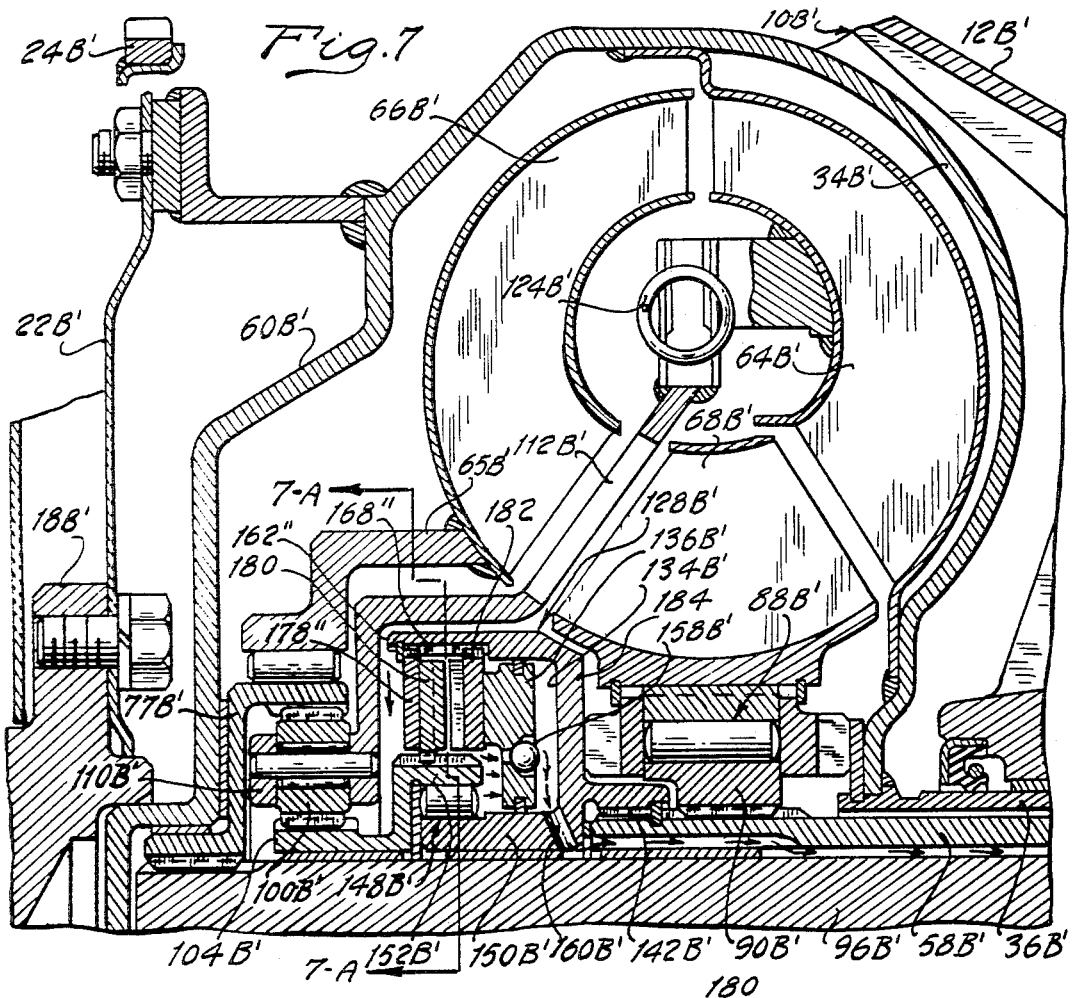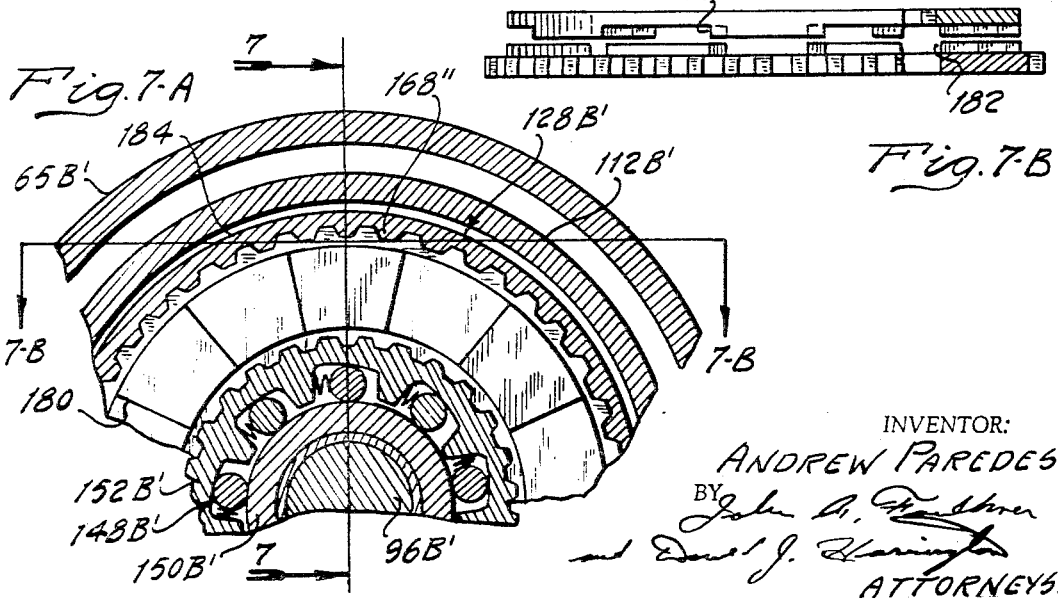

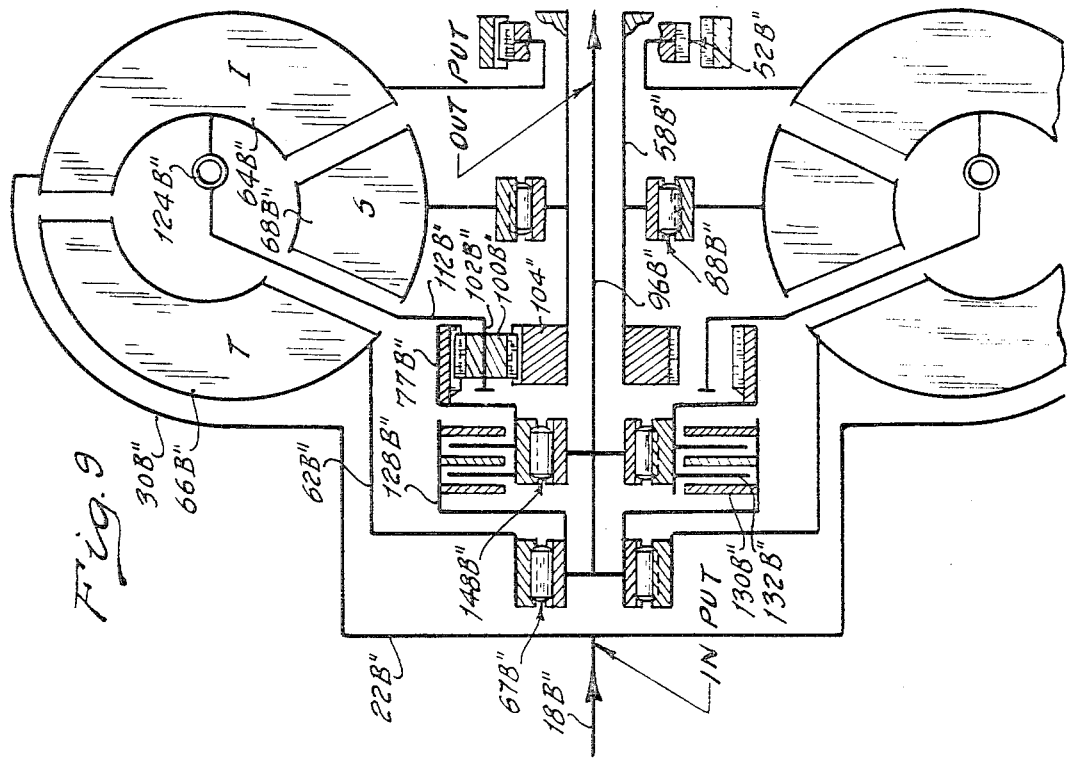
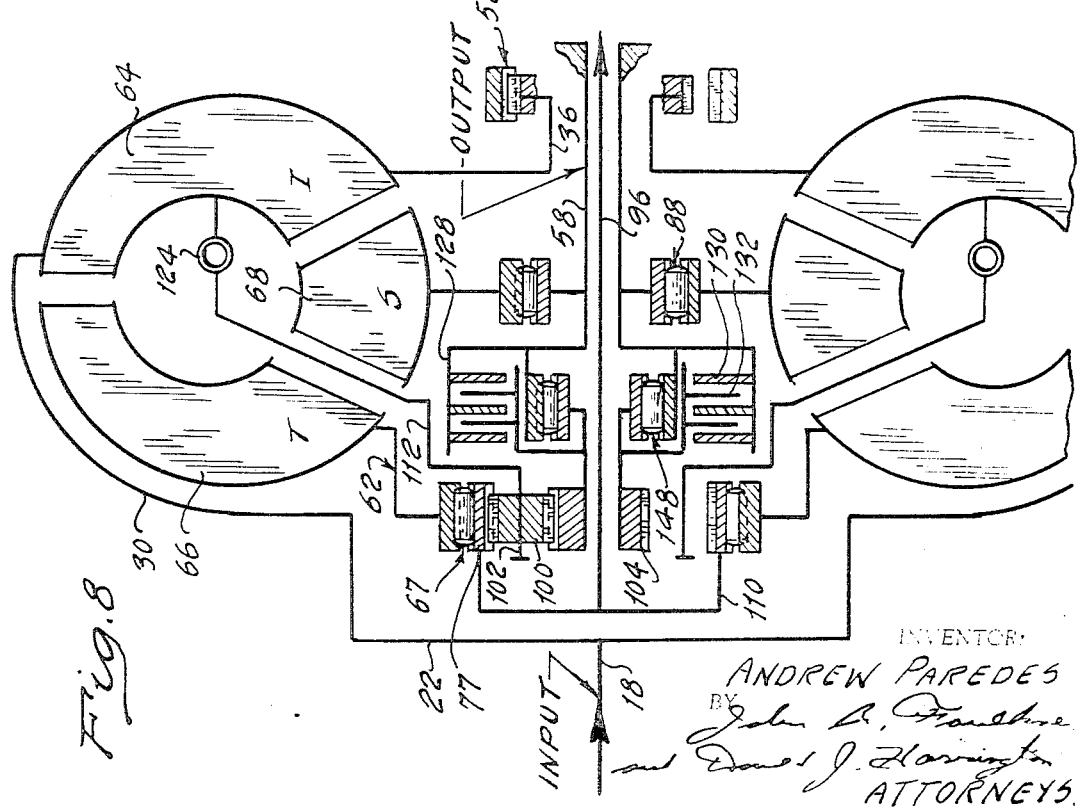

United States Patent Office 3,473,411
Patented Oct. 21, 1969

3,473,411
HYDROKINETIC TORQUE CONVERTER TRANSMISSION WITH MECHANICAL OVERDRIVE
Andrew Paredes, Wayne, Mich., assignor to Ford Motor Company, Dearborn, Mich., a corporation of Delaware
Filed Feb. 20, 1968, Ser. No. 706,936
Int. Cl. F16h 3/04, 47/08, 57/10
U.S. Cl. 74—688                             15 Claims

ABSTRACT OF THE DISCLOSURE

This specification describes a hydrokinetic torque converter for use in an automotive vehicle driveline. The converter includes overdrive gearing disposed between the turbine and the impeller shell. The gearing overspeeds the converter driven shaft as it establishes a mechanical torque delivery path between the impeller and the driven shaft. When the gearing is inactive, hydrokinetic torque delivery path is established. Improved clutch structure control ratio changes in the overdrive gearing.

GENERAL DESCRIPTION OF THE INVENTION

My improved converter is adapted for use in automotive vehicle drivelines for delivering driving torque from an internal combustion engine to the vehicle traction wheels. Provision is made for establishing a mechanical overdrive during cruising operation when hydrokinetic torque multiplication is not required.

A preferred embodiment of my invention includes a hydrokinetic torque converter having an impeller, a turbine and a stator situated in torodial fluid flow relationship with the impeller connected directly to the vehicle engine. The torque converter housing comprises an impeller shell that provides a closed cavity for the torus circuit.

Overdrive gearing is situated within the converter shell as a self-contained unit so that torque can be delivered either hydrokinetically through the torque converter to a turbine shaft or through the overdrive gearing to the turbine shaft. In the latter case, the hydrokinetic torque delivery path is interrupted and torque is delivered mechanically from the engine to the turbine shaft. The hydrokinetic torque delivery path is in parallel relationship to the mechanical torque delivery path and is rendered inactive as the mechanism is conditioned for mechanical torque delivery.

The two drive conditions are selected by appropriately controlling the application and release of a single mechanical coupling device which controls the relative motion of gear elements of the overdrive gearing.

The gearing includes a planet gear carrier member which is connected to the engine drive impeller of the converter. The reaction element of the gearing is anchored against the relatively stationary housing by an overrunning brake. The coupling device is applied to connect together two torque delivery elements of the gearing system to establish overdrive operation. The element of the gearing that is overspeeded with respect to the impeller is connected to the turbine shaft, thus producing a mechanical overdrive ratio.

During normal hydrokinetic operation the mechanical coupling device, which is fluid pressure controlled, is inactive, and torque is delivered directly from the turbine to the turbine shaft through an overrunning coupling, the latter assuming a free-wheeling condition during overdrive operation.

The mechanical coupling device is engaged and disengaged by controlling the direction of flow of fluid through the torus circuit of the converter. In my improved structure a piston member of the coupling device is subjected to the fluid pressure that exists at the flow entrance side of the torus circuit while the other side of the piston is subjected to the discharge pressure when application of the coupling device is desired. This produces a pressure differential that exists only if the direction of flow through the converter is such that the pressure on the apply side of the piston is greater than the pressure on the other side. When the flow is in that direction, the mechanism is conditioned for mechanical overdrive operation. On the other hand, when the flow is reversed, the pressure differential across the piston is reversed and the casting device becomes released. Under these conditions, when the flow is circulated through the torus circuit in the reverse direction, the mechanism is adapted for hydrokinetic operation.

Since torus feed flow is not required during mechanical overdrive operation, provision may be made for interrupting the flow without interrupting the force differential on the piston which keeps the piston applied. This is achieved in my improved structure by providing a ball check valve in the feed passage for the torus circuit, which will become seated to interrupt the flow when the supply pressure for the torus circuit acts upon the clutch piston to apply the overrunning clutch. The ball becomes unseated to open the feed passage, however, upon a reversal in the direction of the flow as the mechanism is caused to function hydrokinetically.

My invention includes, therefore, a hydrokinetic torque converter transmission having both a hydrokinetic torque delivery range and a fully mechanical, overdrive operating range which will achieve maximum operating economy during cruising without sacrificing desired road performance during the acceleration period.

DESCRIPTION OF THE FIGURES OF THE DRAWINGS

FIGURES 1A and 1B show in longitudinal cross-sectional form a first form of my invention.

FIGURE 2 is a view similar to the view in FIGURE 1A, although it shows a modified overdrive clutch structure.

FIGURES 3 and 3A show in cross-sectional form enlarged views of the FIGURE 2 construction, another overdrive clutch mechanism for achieving overdrive operation, each figure showing a different operating position of the clutch elements. FIGURE 3A is taken along the plane of section line 3A—3A of FIGURE 4A. This clutch includes a synchronizer for establishing synchronism between the relatively rotatable parts of the clutch structure prior to completion of the clutch engagement.

FIGURE 4 and 4A are cross-sectional views taken along the planes of section lines 4—4 and 4A—4A of FIGURES 3 and 3A, respectively.

FIGURE 5 shows another synchronized, positive-engagement clutch capable of being used in my improved transmission.

FIGURES 5A, 5B, 5C and 5D show the structure of FIGURE 5 in various operating positions. FIGURE 5A is taken along section line 5A—5A of FIGURE 5C, FIGURE 5 B is taken along section line 5B—5B of FIGURE 5, FIGURE 5C is taken along section line 5C—5C of FIGURE 5A, and FIGURE 5D is taken along section line 5D—5D of FIGURE 5C.

FIGURE 6 shows in cross section along section line 6—6 of FIGURE 6A, another form of positive engageable clutch capable of being used with the structure of FIGURE 1.

FIGURES 6A, 6B, 6C and 6D are cross-sectional views taken along the planes of section lines 6A—6A, 6B—6B, 6C—6C and 6D—6D of FIGURES, 6, 6C and 6D.

FIGURE 7 shows another clutch construtcion. It is taken along section line 7—7 of FIGURE 7A.

FIGURE 7A is a cross-sectional view taken along section line 7A—7A of FIGURE 7.

FIGURE 7B is a plane view as seen from the plane of section line 7B—7B of FIGURE 7A.

FIGURES 8 and 9 show in schematic form alternate construction for distributing torque from the impeller to the turbine shaft during overdrive operation. FIGURE 8 corresponds to FIGURES 1A and 1B.

PARTICULAR DESCRIPTION OF THE INVENTION

In FIGURES 1A and 1B, numeral 10 designates generally the transmission housing which may be bolted or otherwise secured to the engine block of an internal combustion engine. It includes a large diameter portion 12, which encloses a hydrokinetic torque converter 14, and a smaller diameter portion 16 which encloses torque-transmitting gearing not shown. This gearing delivers torque to the power output member, which is connected to the vehicle traction wheels through a driveshaft and a differential-and-axle assembly.

The vehicle engine includes a crankshaft 18 which is flanged at 20 to provide a bolted connection with an impeller driveplate 22. The margin of the plate 22 carries a starter ring gear 24 for cranking the engine. Plate 22 is bolted at 26 to a drive flange 28 formed on a converter shell part 30. The outer periphery 32 of shell part 30 is bolted to an impeller shell part 34. Part 34 has a semi-toroidal shape and is secured to a hub in the form of a sleeve 36. This sleeve is journalled by bushing 38 within bearing opening 40 formed in housing wall 42. This wall is secured by bolts 44 to an internal shoulder 46 formed in the housing 10. Sleeve 36 is drivably connected in the usual fashion to pump gear element 48 which meshes with a cooperating internal pump gear element 50. These elements define a positive displacement pump 52 which is situated within a pump cavity 54. The pump cavity is closed by a flange 56 formed on the stator sleeve shaft 58 extending concentrically with respect to the sleeve 36.

Pump 52 serves as a fluid pressure source for an automatic control valve system for the multiple ratio gearing and for supplying fluid to the torus circuit of the converter 14. The shell part 30 extends forwardly, as shown at 60, to provide a cavity within the converter housing which contains overdrive gearing identified generally by reference character 62.

The converter 14 includes a bladed impelled 64, a bladed turbine 66 and a bladed stator 68. The impeller 64 includes an outer shroud 70 which is secured at 72 to the internal surface of the shell part 34. The radially inward margin of the shroud 70 is secured at 74 to the shell part 34 at a radially inward location. Impeller 64 includes also an inner shroud 76 which cooperates with shroud 70 to define a radial outflow passage that is occupied by impeller blades.

The turbine 66 includes an outer stroud 78 and an inner shroud 80 between which are situated turbine blades. These define radial inflow passages between the shrouds 78 and 80.

The stator 68 includes a shroud 82 having a central opening 84 which receives the outer race 86 of an overrunning brake 88. Brake 88 includes an internally splined inner race 90 and overrunning coupling rollers 92 situated between the races. The race 86 can be provided with cam surfaces which cooperate with the rollers 92 to establish a one-way braking action, thus causing the stator 68 to be anchored against rotation in a direction opposite to direction of motion of the impeller, although freewheeling motion in the direction of rotation of the impeller is permitted.

The race 90 is splined to stationary sleeve shaft 58.

A spacer 94 is located between the brake 88 and the hub portion of the shell part 34.

Overdrive gearing 62 includes an outer clutch race 65 for an overrunning turbine coupling 67. Race 65 is interlocked with thrust spring 69, which is bolted by bolts 71 to a bearing ring 73 secured to the power turbine shroud 78. Outer race 65 thus can rotate with the turbine 67. A thrust washer 75 is situated between the race 65 and the converter shell extension 60.

A planetary ring gear 77 serves as the inner race for the overrunning coupling 67. Located between the race 65 and the outer surface of the ring gear 77 are overrunning coupling elements in the form of rollers or sprags, preferably the former, as shown at 79. If rollers are used, the outer race 65 can be cammed to establish a camming action with the rollers, thereby effecting a one-way connection between ring gear 77 and the turbine 66.

A bushing 81 located between the ring gear 77 and the thrust ring 69 helps support the ring gear. The turbine shaft 96 is connected directly to ring gear 77 by annular planetary member 98. Ring gear 77 engages planetary pinions 100, which are journalled on pinion shafts 102. Pinions 100 in turn engage drivably sun gear 104 which is supported by bushing 106 on turbine shaft 96. Sun gear 104 is keyed directly to clutch member 108. A planetary carrier assembly 110, of which planetary pinion shafts 102 form a part, is connected directly to an impeller torque transfer member 112. A thrust ring 114 is connected to member 112. The thrust washer 116 is situated between the ring 114 and a ring 69.

Impeller torque transfer member 112 extends radially through the torus circuit of the converter 14. It is located intermediate the flow exit section of the turbine 66 and the flow entrance section of the stator 68. In the eye of the torus for the converter 14, and between the inner shroud 76 and the member 112, is a vibration damper disc 118 having radially extending spring recesses defined by radial projections 120. A damper spring carrier ring 122 is secured to the inner impeller shroud 76. The damper springs 124 are located between the projections 120 and are carried by the carrier ring 122 to establish a resilient connection between member 114 and the impeller 64.

Clutch member 106 forms a part of an overdrive clutch generally identified by reference character 126. Clutch 126 includes a clutch drum 128 which is internally splined to carry externally splined clutch discs 130. Clutch member 106 is externally splined to carry internally splined clutch discs 132, which are situated adjacent discs 130.

An annular cylinder 134 is formed in drum 128. It receives an annular piston 136 which cooperates with the cylinder 134 to define an annular pressure chamber.

Piston 136 can be connected to a pressure plate 138 for the clutch 126 by means of a Belleville spring 140. The pressure force action on the piston 130 thus is multiplied by the spring 140 as it applies a clutch engaging force to the discs of the clutch 126. Spring 140 also acts to return the piston to the clutch release position when fluid pressure is relieved from the working chamber behind the piston 136.

The clutch drum 128 is splined at 142 to the stationary stator sleeve shaft 58.

A thrust washer 144 is located between clutch drum 128 and a spacer ring 146 situated adjacent the overrunning brake 88.

A second overrunning coupling used for coast-braking purposes is shown at 148. It includes an inner race 150 journalled on turbine shaft 96, and outer race 152 connected directly to thrust plate 138 by means of a sliding spline connection 154, and overrunning coupling elements 156, preferably in the form of rollers. The rollers engage cam surfaces formed on the race 152.

Pressure plate 138 is splined slidably to the internal splines of the drum 128.

Piston 136 is formed with a valve opening 157 which defines a tapered seat for a ball check valve 158. The valve 158 is closed whenever the pressure chamber behind the piston 136 is pressurized.

During operation of the transmission structure in the performance range, the clutch 126 is released. As turbine torque is developed, the overrunning coupling 67 transfers the turbine torque directly to the turbine shaft 96. The inner race for the coupling 67, which is common to the ring gear for the planetary gear unit, of necessity will be rotating slower than the speed of the carrier 110. This is due to the fact that the carrier 110 is connected directly to the impeller through the torque transfer member 112. Therefore, the sun gear 104 will freewheel and the planetary gear unit will be ineffective for torque transfer. The torque that is developed hydrokinetically by the turbine is transferred directly to the output shaft in the usual fashion. The output shaft, or turbine shaft 96, is connected to the power input gear element of the multiple ratio power transmission gearing arrangement.

During performance operation in the converter range, converter feed oil is transferred to the torus circuit through the annular space defined by the concentric sleeves 36 and 58. The oil then passes radially outwardly, through spaces 94 and into the inlet side of the impeller. Fluid circulates through the torus circuit in known fashion. The return flow from the torus circuit passes through the overdrive gearing 62 in a radially inward direction and then to the right-hand side of the piston 136. This unseats the valve element 158 so that the torus flow through the converter is defined in part by the passage 157. The fluid then passes through the feed port 160 for the cylinder 134 and then to the annular space between turbine shaft 96 and sleeve 58. It then is returned to the low pressure side of the converter feed circuit.

To condition the mechanism for overdrive operation following operation in the performance range, the direction of the feed through the torus circuit is reversed. Thus the annular space between shaft 96 and sleeve 58 becomes an inlet passage, and the annular space between sleeves 36 and 58 becomes a flow return passage. A pressure then develops in the cylinder 134, thus causing the valve 158 to assume a passage closing position. This then causes a pressure force to be developed on the piston 136, which causes the friction clutch 126 to become applied. This anchors the sun gear 104.

The impeller, which is connected directly to the carrier 110, delivers engine torque to the carrier 110. Since the sun gear 104 is anchored, the ring gear 77 will be overspeeded with respect to the turbine. This overspeeding or freewheeling motion is permitted by the overrunning coupling 79. The overspeeded ring gear 77 then drives turbine shaft 96 at a speed that is greater than the speed of the engine. The turbine at this time is inactive and it simply floats in the circuit. It is not necessary for flow to circulate through the torus circuit during overdrive operation since cooling is not required. The ball check valve 158, in addition to causing a pressure development behind the piston 136, will interrupt the passage of fluid through the torus circuit, although a slight leakage through a bypass orifice can be provided if this is desired. This would given assurance that the converter will be filled at all times.

The reversal in the direction of the torus feed through the circuit can be accomplished in any one of several ways. Preferably it is done by using a so-called "switching" valve in the conduit structure that connects the pressure source to the converter. The valve can be made to respond to operating variables, such as engine torque and road speed, so that a transition from the performance operating range to the overdrive operating range can be accomplished automatically.

If the operator should desire coast braking during operation in the performance range, he may relax the engine throttle, thereby causing the engine to decelerate. The vehicle traction wheels then will deliver braking torque through the shaft 96 to the ring gear 77. Sun gear 104 then will tend to rotate in the opposite direction since the carrier 110 resists rotation. But the overrunning brake shown in part at 156 will prevent this freewheeling motion of the sun gear. Thus the carrier will be driven by the turbine shaft 96. Braking torque then is distributed mechanically in a reverse direction through the planetary gear unit to the engine. During normal operation, however, the overrunning coupling shown in part at 156 freewheels.

In FIGURE 5 I have illustrated an alternate clutch arrangement for use in an environment of the type shown in FIGURES 1A and 1B. FIGURE 5C shows the clutch of FIGURE 5 in the engaged condition. Instead of the friction disc clutch 126, I employ a dog-type synchronizer clutch 162. This includes a blocker ring 164 and an engagement ring 166. The engagement ring is shifted by and is connected to the piston 136A". The engagement ring is externally splined to internal splines in the clutch drum 128 A". Projections in the form of tungs 170 extend through an elongated arcuate slot 172 formed in engagement ring 166. The width of each slot is substantially greater than the width of its tung 170 so that lost motion can occur between the engagement ring 166 and the blocker ring 164.

Engagement ring 166 carries synchronizer teeth 174, which are adapted to register with synchonizer openings 176 formed in blocker ring 164 when the blocker ring 164 and the sun gear 104A" are in synchronism. A clutch element having external clutch teeth is carried by sun gear 104A" as shown at 178. External teeth of element 178 are engaged by projections 174 when they are inserted through the openings 176.

If the sun gear is out of synchronism with respect to the blocker ring 164, the blocker ring will prevent advancement of the engagement ring 166. This condition is illustrated in FIGURE 5B. If the synchronism is achieved, the projection 174 will be received through the openings 176, thereby locating the clutch drum 128A" with respect to the sun gear 104A". This synchronized condition is shown in FIGURE 5A.

Each of the elements of FIGURE 5 that has a counterpart in the FIGURE 1 construction have been illustrated by similar reference characters, although the notation A" has been added.

In FIGURES 6 through 6D I have shown another positive engagement, synchronized, double-clutch arrangement capable of being used in the embodiment of FIGURES 1A and 1B. This structure is similar to the structure of FIGURES 5 through 5D except that the blocker ring 164' is provided with externally splined teeth that have a tooth thickness substantially less than the width of the space between the splined teeth of the internal splines for drum 128A'". In this way lost motion can occur between the engagement ring 170' and the clutch drum 128A'". The engagement ring 170', as in the embodiment of FIGURE 5, inhibits advancement of the piston 136A'" when the sun gear 104A'" is out of synchronism with respect to the drum 128A'". After synchronism is achieved, however, the engagement ring 170' can advance through the openings formed in the blocker ring 164' to effect engagement with the clutch member 178'.

The elements in FIGURES 6 through 6D that have counterparts in FIGURES 5 through 5D have similar reference characters, although the notation A'" has been added.

In FIGURES 7, 7A and 7B I have illustrated another type of overdrive clutch that might be used instead of the clutch shown at 126 in FIGURE 1A. In this instance the single clutch disc 180, which is connected directly to the sun gear of the planetary gear unit, is provided with radially extending slots 182 which receive projections formed on a clutch member 182. Member 182 is in the form of a disc that is externally splined to the internal splines of the clutch drum 184, which forms a counterpart for the clutch drum 128 of FIGURE 1. All of the other elements of the embodiment of FIGURES 7, 7A and 7B have counterparts in the FIGURE 1 construction, and they have been designated by similar reference characters, although the notation B' has been added. When the member 182 engages the disc 180, a positive driving connection is established rather than a frictional connection.

In FIGURE 2 I have illustrated still another form of overdrive clutch. This includes a reduced area piston 190 situated in an annular cylinder 192, which forms a counterpart for the annular clutch cylinder of the previous embodiments. Piston 190 is actuated by fluid pressure admitted to a cylinder 192 through a port 194. A ball check valve 196 is located in a passage formed in the clutch drum 198.

The ball check valve 196 is adapted to open and close an orifice bypass for the clutch cylinder 192 when the toroidal fluid flow passes from the torus circuit to the flow return passage situated between the central turbine shaft and the surrounding stator shaft. The orifice is calibrated to produce a differential area across the orifice, thereby creating a pressure force that returns the piston 190 to the inactive position.

When the annular passage between the turbine shaft and the stator sleeve shaft acts as a torus feed passage, a pressure develops in cylinder 192 which causes the piston 190 to shift in a left-hand direction.

The piston 190 carries clutch elements 200 which engage clutch teeth 202 carried by a clutch element 204, the latter being connected directly to the planetary sun gear. A blocker ring 206 can be splined to the internal splined teeth of the drum 198. It also serves to support the outer clutch race of the overrunning coupling 208, which corresponds to the overrunning coupling 148 of the FIGURE 1A embodiment. A lost motion may be provided between the external splined teeth of blocker ring 206 and the internal splined teeth of drum 198 so that the piston will be inhibited from advancing into engagement with the clutch teeth 202 when the sun gear is out of synchronism with respect to the elements 200.

The elements of the FIGURE 2 construction that have counterparts in FIGURES 1A and 1B have been designated by similar reference characters, although the reference character A' has been added.

FIGURE 8 shows a schematic diagram of the FIGURE 1A construction. FIGURE 9 is similar to FIGURE 8, but it shows a variation of the friction clutch elements. The mode of operation of the FIGURE 9 construction is the same as that of the FIGURE 8 construction, and the counterpart elements in both constructions have similar reference characters, the reference notation B'' has been added to the reversals in FIGURE 9.

In FIGURE 9, the sun gear is held stationary at all times. The overdriven ring gear can be clutched selectively to the turbine shaft as the clutch friction elements become engaged under torus circuit pressure. A reversal in the torus feed direction releases the clutch. The clutch of FIGURE 9 is controlled in the same way as the brake of FIGURE 9.

Having thus described preferred forms of my invention, what I claim and desire to secure by U.S. Letters Patent is:

1. A power transmission mechanism comprising a hydro-kinetic torque converter having an impeller, a turbine and a stator situated in toroidal fluid flow relationship, a driving member, said impeller being connected to said driving member, a driven member, a converter casing connected to and rotatable with said impeller and enclosing said turbine and stator, a driven member extending concentrically through said converter in coaxial disposition therewith, overdrive gearing disposed in said casing including a planetary gear unit having a ring gear, a sun gear, a carrier and planet pinions rotatably mounted on said carrier in meshing engagement with said sun and ring gears, means for connecting said ring gear drivably to said driven member, overrunning coupling means for establishing a direct mechanical connection between said turbine and said driven member, a relatively stationary drum adjacent said planetary gear unit and partly defining a fluid pressure operated servo, coupling means for connecting one of said planetary unit members to said drum, said coupling means being applied and released by said servo as the latter is actuated thereby causing said sun gear to be anchored selectively to said stationary drum to establish an overdrive condition between said driving member and said driven member, said carrier member being connected mechanically to said impeller and means for applying to said piston a hydrostatic pressure made available to said converter whereby a mechanical overdrive torque delivery path is established in parallel relationship with respect to the hydrokinetic torque delivery path of said converter.

2. A power transmission mechanism comprising a hydrokinetic torque converter having an impeller, a turbine and a stator situated in toroidal fluid flow relationship, a driving member, said impeller being connected to said driving member, a driven member, a converter casing connected to and rotatable with said impeller and enclosing said turbine and stator, a driven member extending concentrically through said converter in coaxial disposition therewith, overdrive gearing disposed in said casing including a planetary gear unit having a ring gear, a sun gear, a carrier and planet pinions rotatably mounted on said carrier in meshing engagement with said sun and ring gears, said ring gear being connected drivably to said driven member, overrunning coupling means for establishing a direct mechanical connection between said turbine and said driven member, a relatively stationary brake drum adjacent said planetary gear unit and partly defining a fluid pressure operated brake servo, brake means for connecting said sun gear to said brake drum, said brake means being applied and released by said servo as the latter is actuated thereby causing said sun gear to be anchored selectively to said stationary brake drum to establish an overdrive condition between said driving member and said driven member, said carrier being connected mechanically to said impeller and means for applying to said piston the hydrostatic pressure made available to said converter whereby a mechanical overdrive torque delivery path is established in parallel relationship with respect to the hydrokinetic torque delivery path of said converter.

3. The combination as set forth in claim 1 wherein said servo comprises a one-way flow valve situated in and partly defining a toroidal fluid feed passage for said converter, the pressure applied to said converter through said feed passage and said valve acting upon said piston when converter fluid is passed through said feed passage in one direction and establishing a pressure differential across said piston which moves said piston to a clutch-releasing position when the direction of flow through said feed passage is in the other direction.

4. The combination as set forth in claim 2 wherein said servo comprises a one-way flow valve situated in and partly defining a toroidal fluid fed passage for said converter, the pressure applied to said converter through said feed passage and said valve acting upon said piston when converter fluid is passed through said feed passage in one direction and establishing a pressure differential across said piston which moves said piston to a clutch-releasing position when the direction of flow through said feed passage is in the other direction.

5. The combination as set forth in claim 1 wherein the mechanical connection between said impeller and said carrier comprises a torque transfer member extending radially inwardly through said converter between the flow exit section of said turbine and the flow entrance section of said stator, said servo being situated radially inwardly with respect to said torque transfer member.

6. The combination as set forth in claim 2 wherein the mechanical connection between said impeller and said carrier comprises a torque transfer member extending radially inwardly through said converter between the flow exit section of said turbine and the flow entrance section of said stator, said servo being situated radially inwardly with respect to said torque transfer member.

7. The combination as set forth in claim 3 wherein the mechanical connection between said impeller and said carrier comprises a torque transfer member extending radially inwardly through said converter between the flow exit section of said turbine and the flow entrance section of said stator, said servo being situated radially inwardly with respect to said torque transfer member.

8. The combination as set forth in claim 1 wherein said coupling means comprises an actuator ring, a mechanical connection between said actuator ring and said drum, a blocker ring, a lost motion connection between said blocking ring and said actuator ring, a positive engagement coupling element connected directly to said sun gear, teeth carried by said actuator ring, tooth openings formed in said blocker ring, the teeth on said actuator ring registering with the openings in said blocker ring when relative motion between said sun gear and said drum ceases thereby permitting said actuator ring to engage drivably said coupling element, said openings in said blocker ring being misaligned with respect to the teeth on said actuator ring when relative motion between said sun gear and said drum takes place.

9. The combination as set forth in claim 2 wherein said brake means comprises an actuator ring, a mechanical connection between said actuator ring and said drum, a blocker ring, a lost motion connection between said blocking ring and said actuator ring, a positive engagement coupling element connected directly to said sun gear, teeth carried by said actuator ring, tooth openings formed in said blocker ring, the teeth on said actuator ring registering with the openings in said blocker ring when relative motion between said sun gear and said drum ceases thereby permitting said actuator ring to engage drivably said coupling element, said openings in said blocker ring being misaligned with respect to the teeth on said actuator ring when relative motion between said sun gear and said drum takes place.

10. The combination as set forth in claim 3 wherein said coupling means comprises an actuator ring, a mechanical connection between said actuator ring and said drum, a blocker ring, a lost motion connection between said blocking ring and said actuator ring, a positive engagement coupling element connected directly to said sun gear, teeth carried by said actuator ring, tooth openings formed in said blocker ring, the teeth on said actuator ring registering with the openings in said blocker ring when relative motion between said sun gear and said drum ceases thereby permitting said actuator ring to engage drivably said coupling element, said openings in said blocker ring being misaligned with respect to the teeth on said actuator ring when relative motion between said sun gear and said drum takes place.

11. The combination as set forth in claim 4 wherein said brake means comprise an actuator ring, a mechanical connection between said actuator ring and said drum, a blocker ring, a lost motion connection between said blocking ring and said actuator ring, a positive engagement coupling element connected directly to said sun gear, teeth carried by said actuator ring, tooth openings formed in said blocker ring, the teeth on said actuator ring registering with the openings in said blocker ring when relative motion between said sun gear and said drum ceases thereby permitting said actuator ring to engage drivably said coupling element, said openings in said blocker ring being misaligned with respect to the teeth on said actuator ring when realtive motion between said sun gear and said drum takes place.

12. The combination as set forth in claim 1 wherein said mechanism includes a second overrunning coupling means for inhibiting rotation of said sun gear in a direction opposite to the direction of rotation of said impeller while accommodating free wheeling motion of said sun gear in the same direction of rotation of said impeller whereby coast braking torque can be delivered from said driven member to said driving member through said hydrokinetic converter.

13. The combination as set forth in claim 2 wherein said mechanism includes a second overrunning coupling means for inhibiting rotation of said sun gear in a direction opposite to the direction of rotation of said impeller while accommodating free wheeling motion of said sun gear in the same direction of rotation of said impeller whereby coast braking torque can be delivered from said driven member to said driving member through said hydrokinetic converter.

14. The combination as set forth in claim 3 wherein said mechanism includes a second overrunning coupling means for inhibiting rotation of said sun gear in a direction opposite to the direction of rotation of said impeller while accommodating free wheeling motion of said sun gear in the same direction of rotation of said impeller whereby coast braking torque can be delivered from said driven member to said driving member through said hydrokinetic converter.

15. The combination as set forth in claim 4 wherein said mechanism includes a second overrunning coupling means for inhibiting rotation of said sun gear in a direction opposite to the direction of rotation of said impeller while accommodating free wheeling motion of said sun gear in the same direction of rotation of said impeller whereby coast braking torque can be delivered from said driven member to said driving member through said hydrokinetic converter.

References Cited

UNITED STATES PATENTS

| | | | |
|---|---|---|---|
| 2,755,688 | 7/1956 | Swennes | 74—688 |
| 2,992,713 | 7/1961 | Stump et al. | 192—3.33 |
| 3,217,563 | 11/1965 | Simpson | 74—688 |
| 3,239,037 | 3/1966 | Croswhite et al. | 192—3.33 X |
| 3,354,746 | 11/1967 | Paredes | 74—688 |
| 3,415,345 | 12/1968 | Cadiou | 192—3.33 |

FOREIGN PATENTS

| | | |
|---|---|---|
| 955,066 | 4/1964 | Great Britain. |
| 1,004,818 | 9/1965 | Great Britain. |

DONLEY J. STOCKING, Primary Examiner

T. C. PERRY, Assistant Examiner

U.S. Cl. X.R.

192—3.33, 53; 74—781

UNITED STATES PATENT OFFICE
CERTIFICATE OF CORRECTION

Patent No. 3,473,411  Dated October 21, 1969

Inventor(s) Andrew Paredes

It is certified that error appears in the above-identified patent and that said Letters Patent are hereby corrected as shown below:

Column 8, line 7, cancel "one"; line 8, cancel "of said planetary unit members" and substitute --said sun gear member--; line 13, cancel "member" (third occurrence); line 26, cancel "a" and substitute --said--; line 46, cancel "piston" and substitute --servo--.

Signed and sealed this 20th day of April 1971.

(SEAL)
Attest:

EDWARD M. FLETCHER, JR.
Attesting Officer

WILLIAM E. SCHUYLER, JR.
Commissioner of Patents